US012279735B2

(12) United States Patent
Kremmel

(10) Patent No.: US 12,279,735 B2
(45) Date of Patent: Apr. 22, 2025

(54) POCKET HANDLE ASSEMBLY FOR AN APPLIANCE

(71) Applicant: Haier US Appliance Solutions, Inc., Wilmington, DE (US)

(72) Inventor: Aldo Vincent Kremmel, Palmyra, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 399 days.

(21) Appl. No.: 17/686,636

(22) Filed: Mar. 4, 2022

(65) Prior Publication Data

US 2023/0277032 A1 Sep. 7, 2023

(51) Int. Cl.

*A47L 15/42* (2006.01)
*E05B 1/00* (2006.01)

(52) U.S. Cl.

CPC ........ *A47L 15/4257* (2013.01); *E05B 1/0015* (2013.01)

(58) Field of Classification Search

None
See application file for complete search history.

(56) References Cited

U.S. PATENT DOCUMENTS 7,856,785 B2 12/2010 Pervan
2011/0192430 A1* 8/2011 Baldwin ............ A47L 15/4257 134/137

FOREIGN PATENT DOCUMENTS

CN 108603523 B 9/2018
DE 102007062005 A1 6/2009

* cited by examiner

*Primary Examiner* — Cristi J Tate-Sims
(74) *Attorney, Agent, or Firm* — Dority & Manning, P.A.

(57) ABSTRACT

A door for an appliance includes a front panel that defines an opening. A pocket handle is mounted to the front panel. A front portion of pocket handle is positioned at the opening of the front panel, and a rear portion of the pocket handle is inset within the front panel along a transverse direction. The pocket handle includes a first pocket body and a second pocket body. The first and second pocket bodies are mounted together to form the pocket handle. The first pocket body contacts the second pocket body along a lap joint at the rear portion of the pocket handle. The first and second pocket bodies overlap along the transverse direction at the lap joint.

17 Claims, 8 Drawing Sheets

POCKET HANDLE ASSEMBLY FOR AN APPLIANCE

FIELD OF THE INVENTION

The present disclosure relates generally to pocket handles for appliances, such as dishwasher appliances.

BACKGROUND OF THE INVENTION

Dishwasher appliances generally include a tub that defines a wash chamber. Rack assemblies can be mounted within the wash chamber of the tub for receipt of articles for washing. Multiple spray assemblies can be positioned within the wash chamber for applying or directing wash fluid towards articles positioned within the rack assemblies in order to clean such articles. Further, dishwasher appliances typically include a door rotatably coupled with the cabinet for providing selective access to the wash chamber.

Certain dishwasher appliance includes a pocket handle. The pocket handle is disposed within the door, and a user may insert his or her fingers into the pocket handle to pull the door open. Pocket handles can require a large cutout in a front panel of the door, which weakens the door and can lead to significant deflection of the front panel when the user pulls the door open with the pocket handle. Moreover, certain pocket handles are undesirably flexible and can feel flimsy when the user pulls the door open with the pocket handle.

BRIEF DESCRIPTION OF THE INVENTION

The present subject matter provides a pocket handle for an appliance that includes features for limiting flexing of a door when the door is pulled open with the pocket handle. One or more projections on the pocket handle may engage a panel bracket within the door. By contacting the panel bracket, the one or more projections may resist flexing of the door. Aspects and advantages of the invention will be set forth in part in the following description, may be apparent from the description, or may be learned through practice of the invention.

In one aspect, a door for an appliance includes a front panel defines an opening. A pocket handle is mounted to the front panel. A front portion of pocket handle is positioned at the opening of the front panel, and a rear portion of the pocket handle is inset within the front panel along a transverse direction. The pocket handle includes a first pocket body and a second pocket body. The first and second pocket bodies are mounted together to form the pocket handle. The first pocket body contacts the second pocket body along a lap joint at the rear portion of the pocket handle. The first and second pocket bodies overlap along the transverse direction at the lap joint.

In another aspect, a dishwasher appliance includes a tub defining a wash chamber. A door is mounted to the tub. The door includes a front panel that defines an opening. A pocket handle is mounted to the front panel. A front portion of pocket handle is positioned at the opening of the front panel, and a rear portion of the pocket handle is inset within the front panel along a transverse direction. The pocket handle includes a first pocket body and a second pocket body. The first and second pocket bodies are mounted together to form the pocket handle. The first pocket body contacts the second pocket body along a lap joint at the rear portion of the pocket handle. The first and second pocket bodies overlap along the transverse direction at the lap joint.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
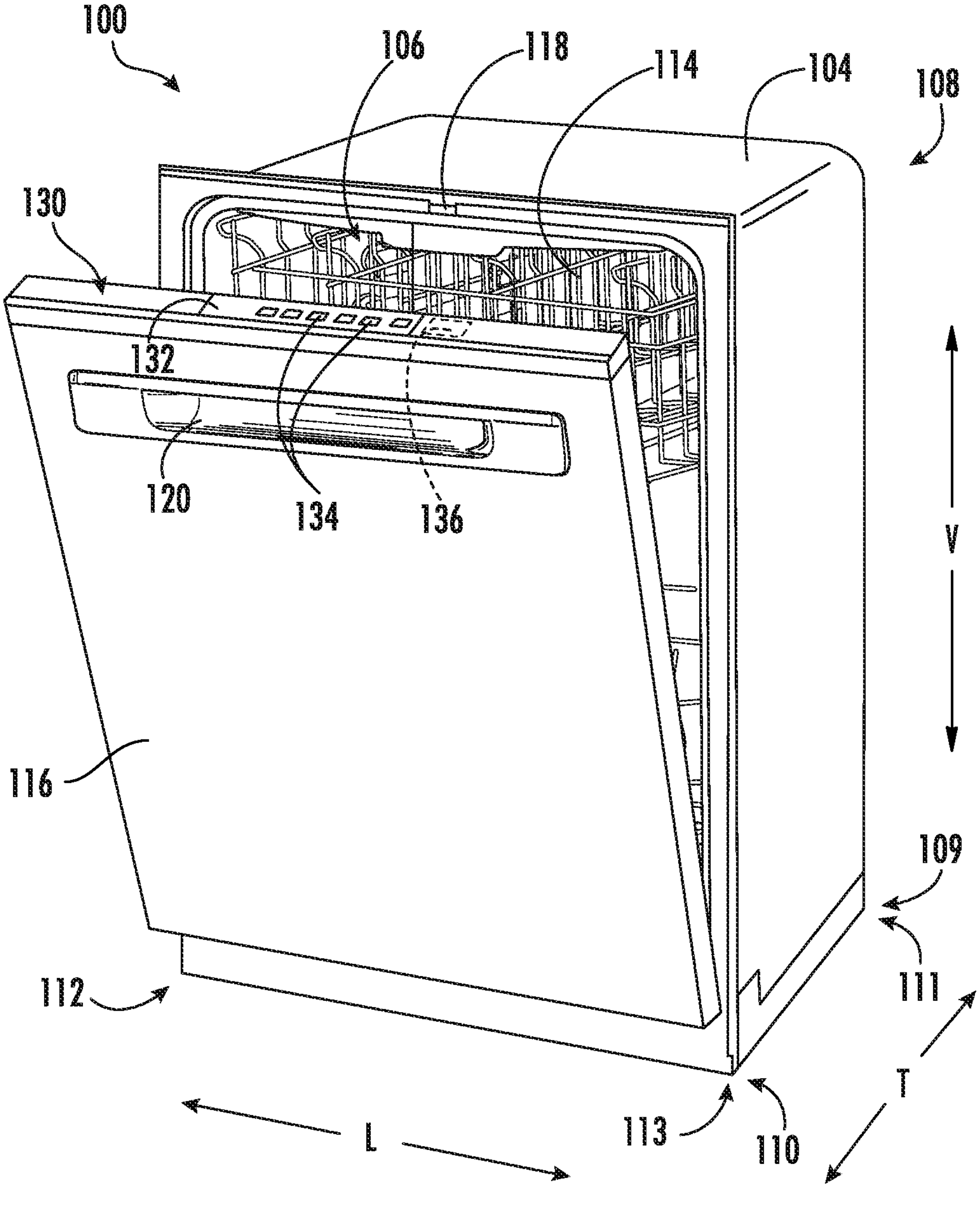
FIG. 1 provides a perspective view of a dishwasher appliance according to an example embodiment of the present disclosure with a door of the dishwasher depicted in a partially open position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

As used herein, the term "article" may refer to, but need not be limited to dishes, pots, pans, silverware, and other cooking utensils and items that can be cleaned in a dishwasher. The term "wash cycle" is intended to refer to one or more periods of time during which a dishwasher operates while containing the articles to be washed and uses a detergent and water to e.g., remove soil particles including food and other undesirable elements from the articles. The term "rinse cycle" is intended to refer to one or more periods of time during which the dishwasher operates to remove residual soil, detergents, and other undesirable elements that were retained by the articles after completion of the wash cycle. The term "drain cycle" is intended to refer to one or more periods of time during which the dishwasher operates to discharge soiled water from the dishwasher. The term "wash fluid" refers to a liquid used for washing and/or rinsing the articles and is typically made up of water that may include other additives such as detergent or other treatments.

FIG. 1 provides a dishwashing appliance or dishwasher 100 according to an example embodiment of the present disclosure. It should be appreciated, however, that the present subject matter is not limited to any particular style, model, or configuration of dishwasher 100. The embodiment depicted in FIG. 1 is for illustrative purposes only. As depicted, dishwasher 100 defines a vertical direction V, a lateral direction L, and a transverse direction T. Each of the vertical direction V, lateral direction L, and transverse direction T are mutually perpendicular to one another and form an orthogonal direction system.

Dishwasher 100 includes a tub 104 that defines a wash chamber 106 configured for receipt of articles for washing, such as pots, pans, dishes, silverware, etc. Tub 104 extends between a top 108 and a bottom 109 along the vertical direction V, between a front 110 and a back 111 along the transverse direction T, and a first side 112 (e.g., a left side) and a second side 113 (e.g., a right side) along the lateral direction L. Tub 104 includes or defines a front opening 114.

A door 116 is operatively coupled with tub 104. Door 116 provides selective access to wash chamber 106. For this embodiment, door 116 is hinged at its bottom with tub 104 for movement between a normally closed vertical position (not shown), wherein the wash chamber 106 is sealed shut for washing operation at front opening 114, and an open position for loading and unloading of articles from dishwasher 100. Door 116 includes a handle 120 that a user may grip to move door 116 between the open and closed positions.

Dishwasher 100 includes various features for washing articles within wash chamber 106. For instance, dishwasher 100 can include rack assemblies mounted within the wash chamber 106 of tub 104 for receipt of articles for washing. Multiple spray assemblies can be positioned within the wash chamber 106 for applying or directing wash fluid towards or onto articles positioned within the rack assemblies in order to clean such articles. Such features are known in the art and thus will not be explained in detail herein.

As further shown in FIG. 1, dishwasher 100 is equipped with a top panel or control panel 130. Generally, control panel 130 provides an interface that facilitates user interaction with dishwasher 100. For instance, a user can select and execute various cycles (e.g., wash cycles and/or drying cycles) and settings using control panel 130. Particularly, control panel 130 includes a user interface 132. User interface 132 includes controls or input selectors 134 that allow a user to select various operational features and modes as well as to monitor progress of dishwasher 100. The input selectors 134 can be one or more of a variety of electrical, mechanical or electro-mechanical input devices, including e.g., rotary dials, push buttons, and touch pads. In some embodiments, the user interface 132 may represent a general purpose I/O ("GPIO") device or functional block. The user interface 132 may include a display component, such as a digital or analog display device designed to provide operational feedback to a user. The user interface 132 may be in communication with a controller 136 via one or more signal lines or shared communication busses.

For this embodiment, control panel 130 is located at a top portion or top end of door 116. Thus, dishwasher 100 may be referred to as a "top control" dishwasher. However, it will be understood that the present subject matter may be used in or with "front control" dishwashers in alternative example embodiments. In such example embodiments, top panel 130 may not include controls or input selectors 134, and, rather, controls or input selectors 134 may be positioned at front panel 140, e.g., on pocket handle 200.

Controller 136 is operatively configured to regulate operation of dishwasher 100. Controller 136 can include one or more memory devices and one or more processors, such as general or special purpose microprocessors operable to execute programming instructions or micro-control code associated with a cleaning cycle, which can include a wash and drying cycle, for example. The one or more memory devices can represent random access memory such as DRAM or read only memory such as ROM or FLASH. In some embodiments, the one or more processors execute programming instructions stored in the one or more memory devices. The one or more memory devices may be separate components from the one or more processors or may be included onboard within the one or more processors. Alternatively, controller 136 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. In some embodiments, input/output ("I/O") signals may be routed between the control system and various operational components of dishwasher 100 along wiring harnesses that may be routed through the bottom of door 116, for example.

Figure 2:
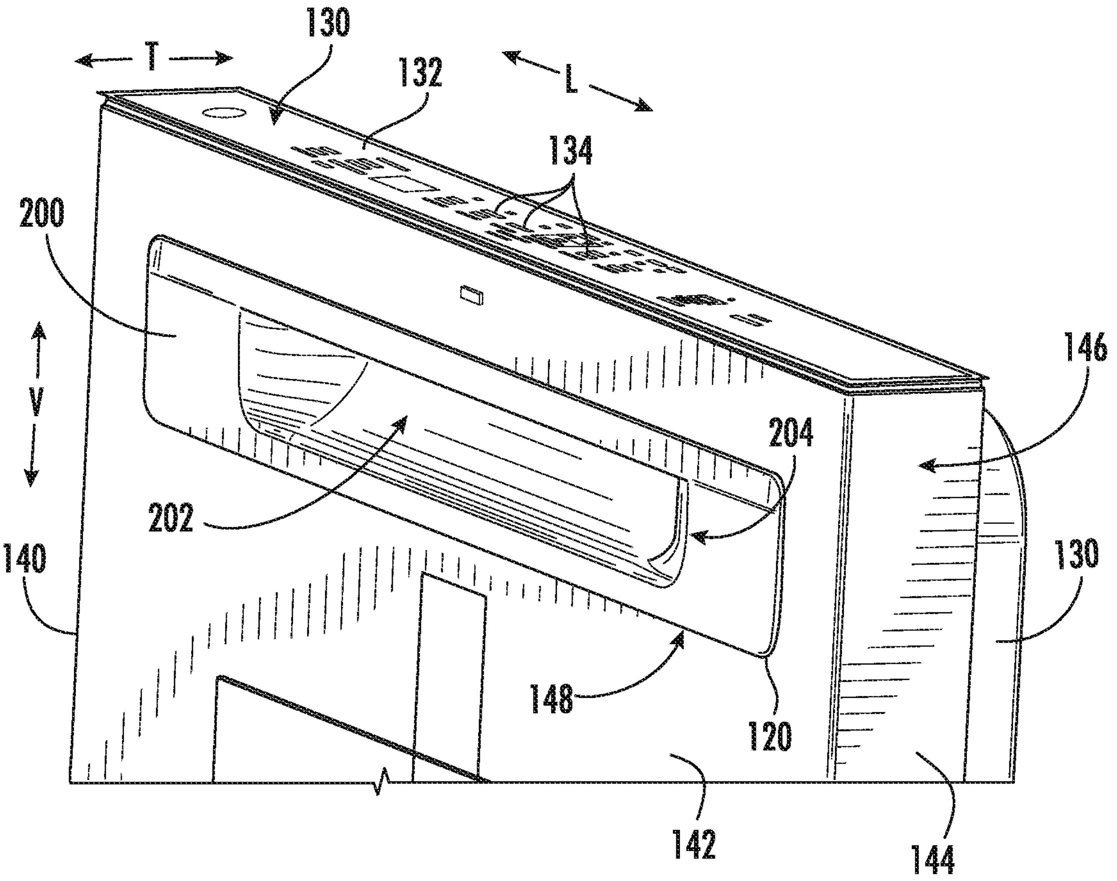
FIG. 2 is a partial perspective view of the door of the example dishwasher appliance of FIG. 1.

As shown in FIG. 2, a pocket handle 200 may be used as handle 120. Thus, pocket handle 200 is described in greater detail below in the context of FIGS. 2 through 6. However, it will be understood that pocket handle 200 may be used in or with other suitable appliances in alternative example embodiments. Pocket handle 200 may include features for limiting flexing of door 116, e.g., when an outward force, such as a user pulling on handle 120, is appliance to open door 116.

Door 116 may include a front panel 140 that defines an opening 148. A size of opening 148 may be selected such that pocket handle 200 is receivable within door 116 at opening 148. For example, a height of opening 148, e.g., along the vertical direction V, may be no less than five centimeters (5 cm) and no more than twelve centimeters (12 cm). A width of opening 148, e.g., along the transverse direction T, may be no less than forty-five centimeters (45 cm) and no more than one hundred centimeters (100 cm). Accordingly, opening 148 may be wider along the transverse direction T and narrower along the vertical direction V.

Front panel 140 may include a front wall 142 and a pair of sidewalls 144. Sidewalls 144 may be oriented generally perpendicular to front wall 142, and sidewalls 144 may be positioned at opposite sides of front wall 142, e.g., along the lateral direction L. Opening 148 may be defined in front wall 142. Front panel 140 may be formed from or with a piece of sheet metal bent to form front wall 142 and sidewalls 144. A rear panel 150 may be mounted to front panel 140, e.g., with fasteners, to assist with forming door 116. Rear panel 150 may face towards wash chamber 106 and front panel 140 may face away from wash chamber 106 when door 116 is closed.

Control panel 130 may be mounted on door 116 such that control panel 130 is positioned at a top portion 146 of front panel 140, and opening 148 may be disposed below control panel 130, e.g., along the vertical direction V, on front panel 140. For instance, opening 148 may be no more than fifteen centimeters (15 cm) below control panel 130 in certain example embodiments. To allow mounting of control panel 130 at top portion 146 of front panel 140, a top panel bracket or control panel bracket 230 may be disposed within front panel 140, and control panel bracket 230 may be mounted within front panel 140 such that control panel bracket 230 is fixed relative to front panel 140. For example, control panel bracket 230 may extend between sidewalls 144 along the lateral direction L within door 116, and control panel bracket 230 may also extend between front wall 142 and rear panel 150 along the transverse direction T. Control panel bracket 230 may be fastened to one or more of sidewalls 144 and rear panel 150 to mount control panel bracket 230 within front panel 140. Control panel 130 may be positioned on and mounted to control panel bracket 230. For example, control panel 130 may be fastened, adhered, snap-fit, etc. to control panel bracket 230 at top portion 146 of front panel 140.

Figure 5:
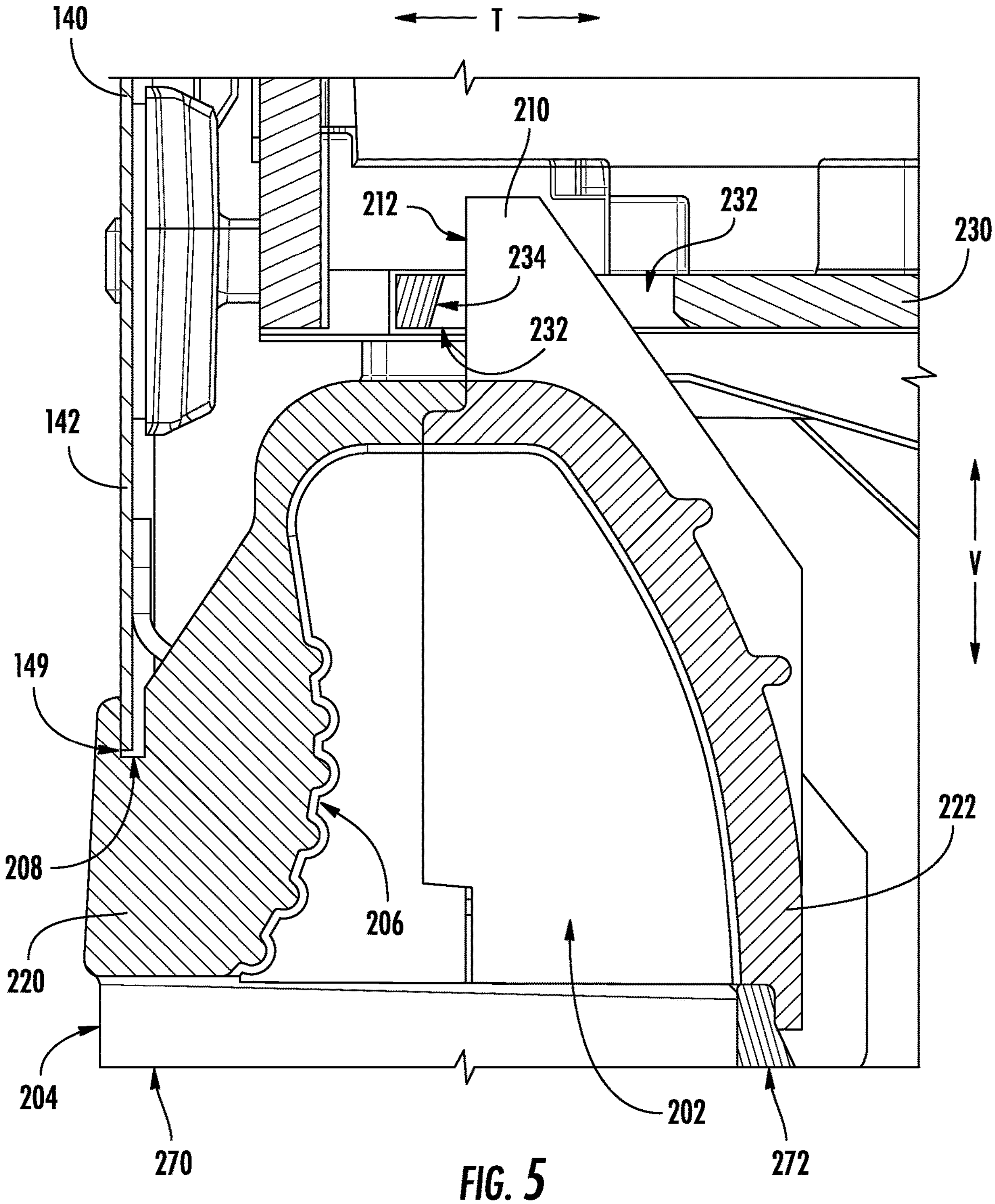
Figure 6:
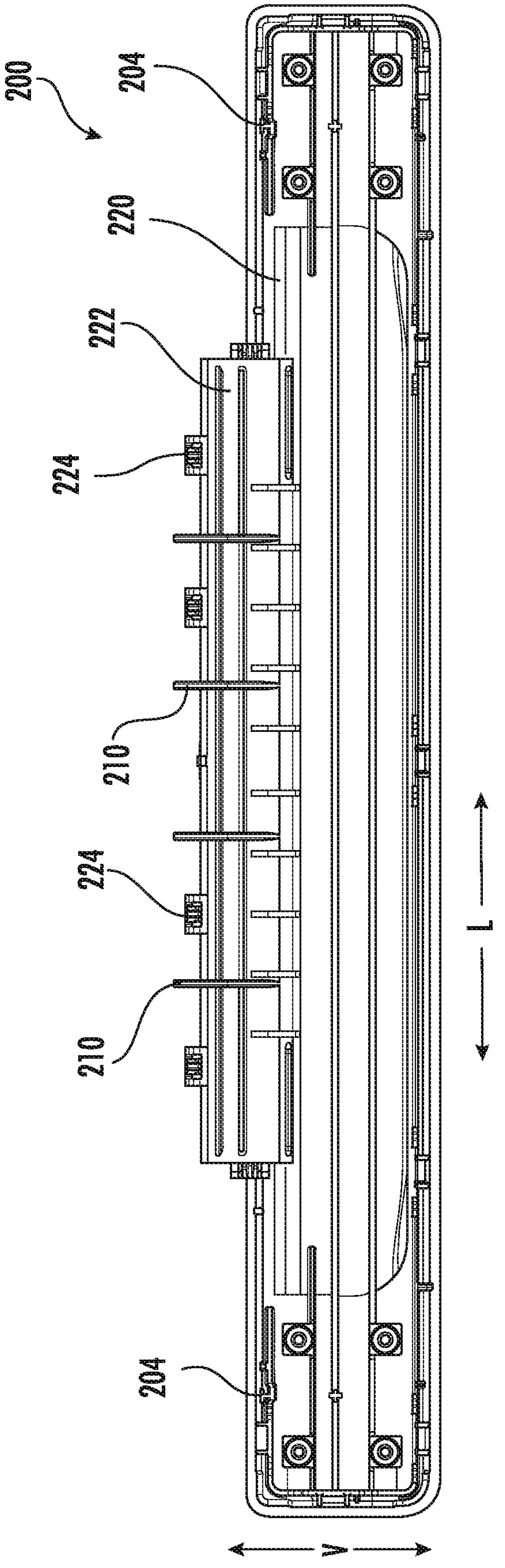
FIG. 6 is a rear view of the example pocket handle of FIG. 3.

As noted above, pocket handle 200 is disposed at opening 148 of front panel 140. For example, pocket handle 200 may be snap-fit, fastened, etc. to door 116 at mounting features 201, e.g., at ends of pocket handle 200. As shown in FIG. 5, pocket handle 200 may extend between a front portion 270 and rear portion 272, e.g., along the transverse direction T. Front portion 270 of pocket handle 200 may be positioned at opening 148 of front panel 140, and rear portion 272 of pocket handle 200 may be inset within front panel 140, e.g., along the transverse direction T.

Pocket handle 200 may define an opening 204 and an interior pocket 202. Opening 204 of pocket handle 200 may be positioned at front panel 140, e.g., front wall 142. Interior pocket 202 may extend into pocket handle 200 from opening 204 of pocket handle 200. A user of dishwasher appliance 100 may insert fingers into interior pocket 202 via opening 204 of pocket handle 200. Within interior pocket 202, pocket handle 200 may define a grip surface 206. Grip surface 206 may be positioned above opening 204 of pocket handle 200 within interior pocket 202. The user of dishwasher appliance 100 may insert fingers into interior pocket 202 as noted above and grasp pocket handle 200 at grip surface 206. Grip surface 206 may include projections, knurls, or other surface formations to increase friction and facilitate a grip of the user on pocket handle 200.

Due to sizing of opening 148 and/or the construction of front panel 140 (e.g., without return flanges around opening 148 or at a center of opening 148), front panel 140, in particular front wall 142, may be flexible along transverse direction T relative to when front panel 140 does not include opening 148 and/or when front panel 140 includes return flanges around opening 148 or at a center of opening 148. Pocket handle 200 may include features for limiting flexing of front panel 140, e.g., along the transverse direction T, when a user pulls on pocket handle 200 to open door 116.

Pocket handle 200 may define a slit 149 above opening 204 of pocket handle 200. An edge of front panel 140 at opening 148 may be disposed within slit 149 of pocket handle 200. Such positioning of edge of front panel 140 within slit 149 may assist with limiting flexing of front panel 140, e.g., along the transverse direction T, when a user pulls on pocket handle 200 to open door 116.

Figure 3:
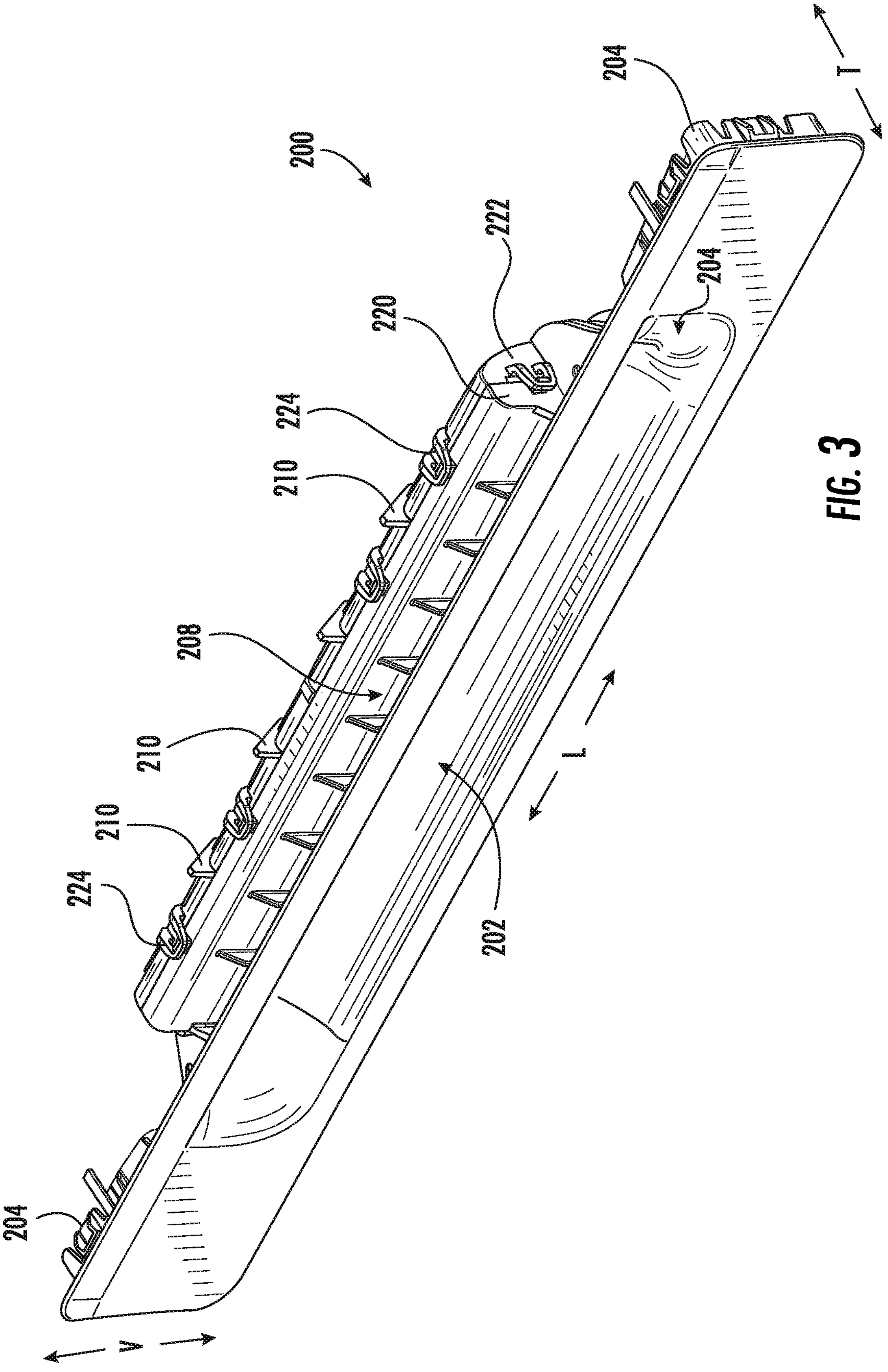
FIG. 3 is a perspective view of a pocket handle according to an example embodiment of the present subject matter.
Figure 4:
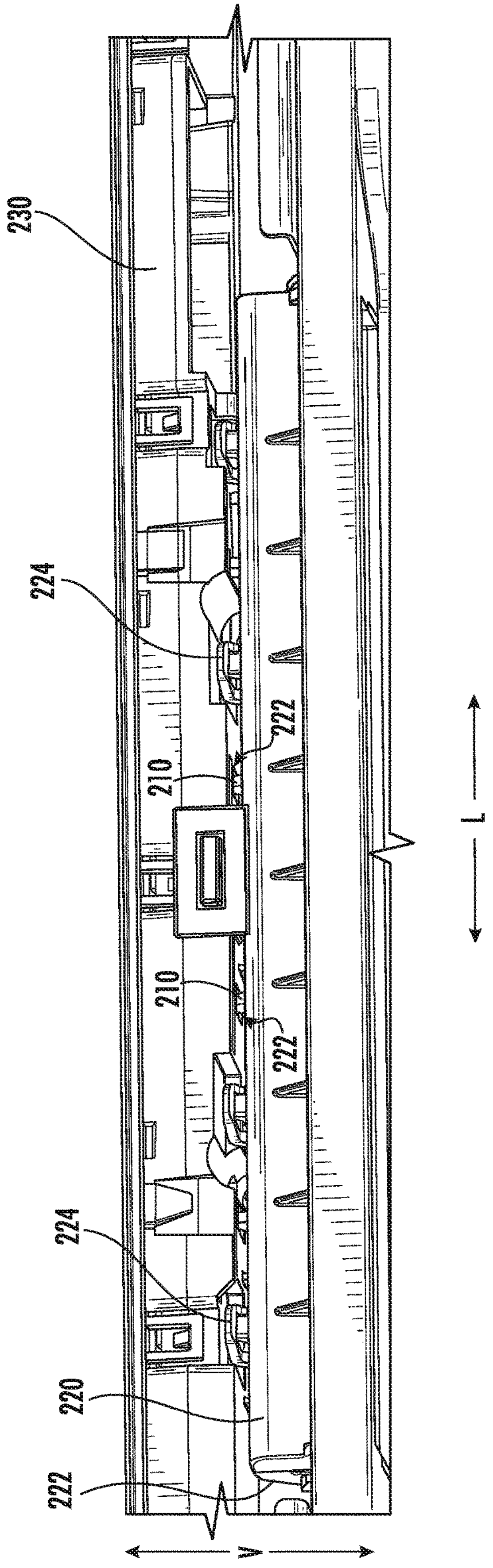
FIGS. 4 and 5 are partial section views of the example pocket handle mounted within the door of the example dishwasher appliance of FIG. 1.

In addition, as shown in FIG. 3, pocket handle 200 includes a plurality of projections 210, and control panel bracket 230 may define a plurality of slots 232. Projections 210 may be ribs, bosses, gussets, hooks, etc. Each projection 210 may be disposed within a respective one of slots 232. When an outward force is applied to pocket handle 200, such as when the user pulls on pocket handle 200 to open door 116, projections 210 may impact against control panel bracket 230 at slots 232 to advantageously limit flexing of front panel 140, e.g., along the transverse direction T. Thus, mechanical interference between projections 210 and control panel bracket 230 at slots 232 may advantageously increase a stiffness of door 116, e.g., despite the presence/size of opening 148 and/or the lack of return flanges around opening 148 or at a center of opening. Projections 210 may be spaced apart, e.g., along the lateral direction L, on pocket handle 200, and slots 232 may be spaced apart, e.g., along the lateral direction L, on control panel bracket 230. Such spacing of projections 210 and/or slots 232 may assist with distributing the force applied to front panel 140 via pocket handle 200 when a user opens door 116 with pocket handle 200.

As shown in FIG. 5, projection 210 may have a contact surface 212, e.g., that faces towards front panel 140 along the transverse direction T. Conversely, control panel bracket 230 has a contact surface 234 at slot 232. Contact surface 234 of control panel bracket 230 may be disposed between front panel 140 (e.g., front wall 142) and projection 210, and contact surface 234 of control panel bracket 230 may face towards contact surface 212 of projection 210, e.g., along the transverse direction T. Contact surface 212 of projection 210 may impact against contact surface 234 of slot 232 when a user pulls pocket handle 200 to open door 116. Contact surface 234 of control panel bracket 230 may be tapered, e.g., along the vertical direction V. Such shaping of contact surface 234 of control panel bracket 230 may assist with guiding projections 210 into slots 232 and/or with decreasing the gap between contact surface 234 of control panel bracket 230 and contact surface 212 of projection 210 as pocket handle 200 is mounted into door 116.

Pocket handle 200 may be constructed of various materials. For example, pocket handle 200 may be constructed of with molded plastic. In the example shown in FIGS. 2 through 6, pocket handle 200 includes a first pocket body 220 and a second pocket body 222. First and second pocket bodies 220, 222 may each be formed from separate pieces of molded plastic, and first and second pocket bodies 220, 222 may be fastened, snap-fit, adhered, or otherwise suitable mounted together to form pocket handle 200. Thus, pocket handle 200 may be a two-piece assembly in certain example embodiments. First pocket body 220 may define opening 204, and first and second pocket bodies 220, 222 may collectively define interior pocket 202 when mounted together. Moreover, first pocket body 220 may define grip surface 206, and projections 210 may be positioned on second pocket body 222.

Figure 7:
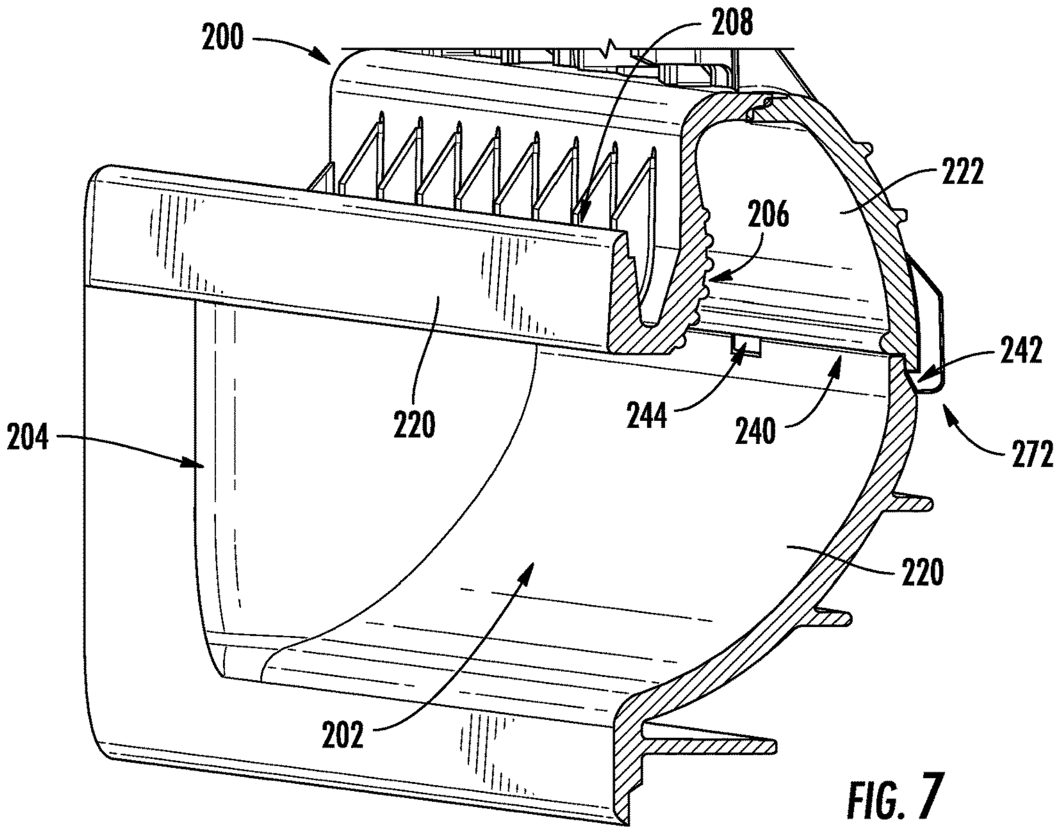
FIG. 7 is a perspective section view of the example pocket handle of FIG. 3.
Figure 8:
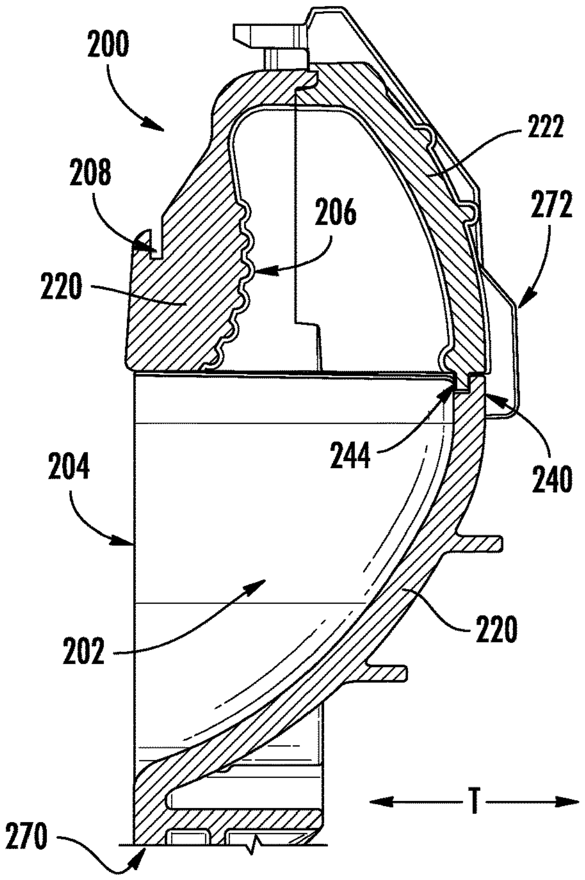
FIG. 8 is another section view of the example pocket handle of FIG. 3.

Pocket handle 200 may also include features for limiting or preventing deflection of the first and second pocket bodies 220, 222, e.g., when a user pulls pocket handle 200 along the transverse direction T. With reference to FIGS. 7 and 8, first pocket body 220 may contact second pocket body 222 along a lap joint 240 at rear portion 272 of pocket handle 200.

Thus, first and second pocket bodies 220, 222 may engage with each other at lap joint 240. First and second pocket bodies 220, 220 may overlap along the transverse direction T at lap joint 240. Due to the overlap between first and second pocket bodies 220, 222 at lap joint 240, deformation of pocket handle 200, e.g., along the transverse direction T, may limited or prevented when a user pulls on pocket handle 200. A length of lap joint 240 along the lateral direction L may be about equal to a length of second pocket body 222 along the lateral direction L, in certain example embodiments. Thus, e.g., lap joint 240 may extend along the length of second pocket body 222 along the lateral direction L.

Lap joint 240 may include a first lap joint portion 242 and a second lap joint portion 244. First and second lap joint portions 242, 244 may be spaced apart, e.g., along the lateral direction L, on pocket handle 200. First and second pocket bodies 220, 222 may have opposite overlaps along the transverse direction T at first and second lap joint portions 242, 244. Thus, e.g., first lap joint portion 242 may limit or prevent deflection of first and second pocket bodies 220, 222 when a user pulls pocket handle 200 one way along the transverse direction T, and, conversely, second lap joint portion 244 may limit or prevent deflection of first and second pocket bodies 220, 222 when a user pushes pocket handle 200 the opposite way along the transverse direction T. First and second lap joint portions 242, 244 may also limit or prevent relative movement between first and second pocket bodies 220, 222, e.g., along the lateral direction L.

Figure 9:
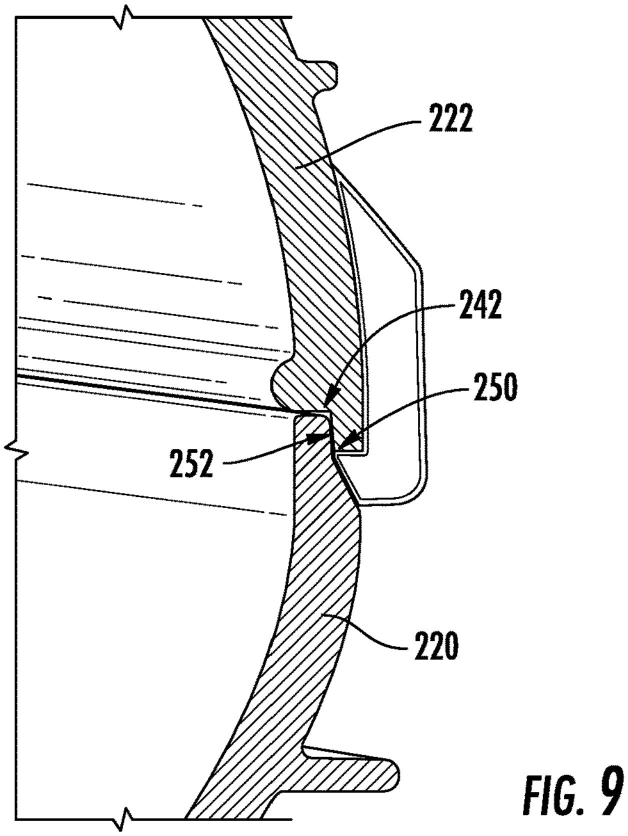
FIG. 9 is a section view of a first lap joint portion of the example pocket handle of FIG. 3.
Figure 10:
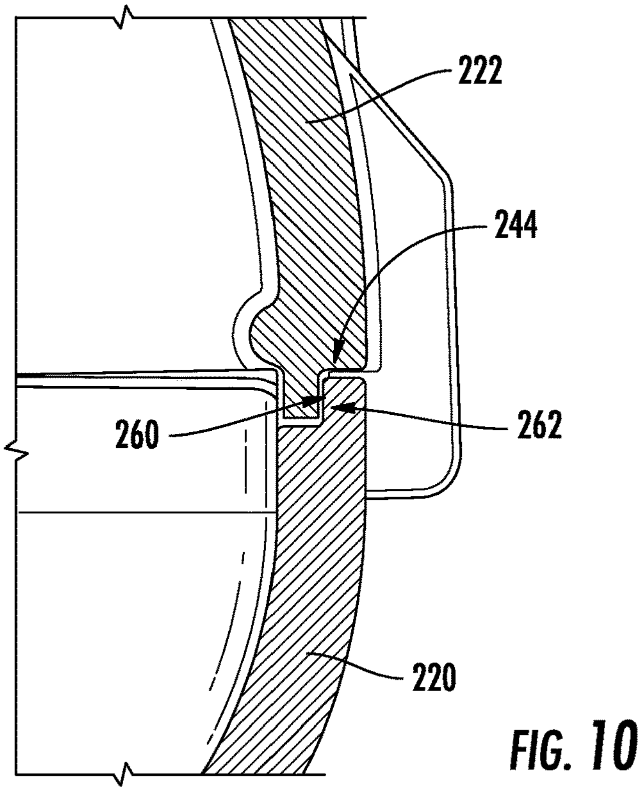
FIG. 10 is a section view of a second lap joint section of the example pocket handle of FIG. 3.

With reference to FIGS. 9 and 10, first and second lap joint portions 242, 244 may have opposing surfaces to form first and second lap joint portions 242, 244. For instance, as shown in FIG. 9, first pocket body 220 may define a first contact surface 250 at first lap joint portion 242, and first contact surface 250 of first pocket body 220 may face front portion 270 of pocket handle 200. Moreover, as shown in FIG. 10, first pocket body 220 may define a second contact surface 260 at second lap joint portion 244, and second contact surface 260 of first pocket body 220 may face rear portion 272 of pocket handle 200. As another example, as shown in FIG. 9, second pocket body 222 defines a first contact surface 252 at first lap joint portion 242, and first contact surface 252 of second pocket body 222 may face rear portion 272 of pocket handle 200. Moreover, as shown in FIG. 10, second pocket body 222 may define a second contact surface 262 at second lap joint portion 244, and second contact surface 262 of second pocket body 222 may face front portion 270 of pocket handle 200. Thus, e.g., first contact surfaces 250, 252 of first and second pocket bodies 220, 222 may face opposite ways along the transverse direction T at first lap joint portion 242, and second contact surfaces 260, 262 of first and second pocket bodies 220, 222 may face opposite ways along the transverse direction T at second lap joint portion 244. First contact surface 250 of first pocket body 220 may be positioned against first contact surface 252 of second pocket body 222 at first lap joint portion 242, and second contact surface 260 of first pocket body 224 may be positioned against second contact surface 262 of second pocket body 222 at second lap joint portion 244. Interference between first contact surfaces 250, 252 at first lap joint portion 242 may limit or prevent deflection of first and second pocket bodies 220, 222 when a user pulls pocket handle 200 one way along the transverse direction T, and interference between second contact surfaces 260, 262 at second lap joint portion 244 may limit or prevent deflection of first and second pocket bodies 220, 222 when a user pushes pocket handle 200 the opposite way along the transverse direction T.

As may be seen from the above, a common joint between first and second pocket bodies 220, 222 may be a lap or tongue and groove interface. Such lap joint assists with smooth and simple assembly of first and second pocket bodies 220, 222 together and may assist with limiting deflection of the pocket handle 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dishwasher appliance, comprising:

a tub defining a wash chamber; and a door mounted to the tub, the door comprising a front panel defining an opening; and a pocket handle mounted to the front panel, a front portion of pocket handle positioned at the opening of the front panel, a rear portion of the pocket handle inset within the front panel along a transverse direction, the pocket handle comprising a first pocket body and a second pocket body, the first and second pocket bodies mounted together to form the pocket handle, wherein the first pocket body contacts the second pocket body along a lap joint at the rear portion of the pocket handle, and the first and second pocket bodies overlap along the transverse direction at the lap joint, wherein the lap joint comprises a first lap joint portion and a second lap joint portion, the first and second pocket bodies having opposite overlaps along the transverse direction at the first and second lap joint portions.

2. The dishwasher appliance of claim 1, wherein:

the first pocket body defines a first contact surface at the first lap joint portion, the first contact surface of the first pocket body faces the front portion of the pocket handle, the first pocket body defines a second contact surface at the second lap joint portion, and the second contact surface of the first pocket body faces the rear portion of the pocket handle;

the second pocket body defines a first contact surface at the first lap joint portion, the first contact surface of the second pocket body faces the rear portion of the pocket handle, the second pocket body defines a second contact surface at the second lap joint portion, and the second contact surface of the second pocket body faces the front portion of the pocket handle; and the first contact surface of the first pocket body is positioned against the first contact surface of the second pocket body at the first lap joint portion, and the second contact surface of the first pocket body is positioned against the second contact surface of the second pocket body at the second lap joint portion.

3. The dishwasher appliance of claim 1, wherein a length of the lap joint along a lateral direction is about equal to a length of the second pocket body along the lateral direction, and the lateral direction is perpendicular to the transverse direction.

4. The dishwasher appliance of claim 1, wherein the door further comprises:

a top panel positioned at a top portion of the front panel above the opening of the front panel; and a top panel bracket disposed within the front panel, the top panel bracket mounted within the front panel such that the panel bracket is fixed relative to the front panel, the top panel positioned on and mounted to the top panel bracket, the top panel bracket defining a slot, wherein the pocket handle comprises a projection, the projection disposed within the slot of the top panel bracket.

5. The dishwasher appliance of claim 4, wherein:

the projection has a contact surface facing towards the front panel;

the top panel bracket has a contact surface at the slot, and the contact surface of the top panel bracket is disposed between the front panel and the projection and faces towards the contact surface of the projection; and wherein the contact surface of the projection impacts against the contact surface of the top panel bracket when an outward force is appliance to the pocket handle.

6. The dishwasher appliance of claim 1, wherein:

the first pocket body defines an opening positioned at the front panel;

the first and second pocket bodies collectively define an interior that extends inwardly from the opening of the pocket handle; and the first pocket body defines a grip surface within the interior above the opening of the first pocket body.

7. The dishwasher appliance of claim 6, wherein the pocket handle defines a slit above the opening of the pocket handle, an edge of the front panel disposed within the slit of the pocket handle.

8. A dishwasher appliance, comprising:

a cabinet;

a tub housed within the cabinet and defining a wash chamber;

a door rotatably mounted to the tub, the door comprising:

a front panel defining an opening; and a pocket handle mounted to the front panel, a front portion of pocket handle positioned at the opening of the front panel, a rear portion of the pocket handle inset within the front panel along a transverse direction, the pocket handle comprising a first pocket body and a second pocket body, the first and second pocket bodies mounted together to form the pocket handle, wherein the first pocket body contacts the second pocket body along a lap joint at the rear portion of the pocket handle, and the first and second pocket bodies overlap along the transverse direction at the lap joint, wherein the lap joint comprises a first lap joint portion and a second lap joint portion, the first and second pocket bodies having opposite overlaps along the transverse direction at the first and second lap joint portions, wherein the first pocket body defines a first contact surface at the first lap joint portion, the first contact surface of the first pocket body faces the front portion of the pocket handle, the first pocket body defines a second contact surface at the second lap joint portion, and the second contact surface of the first pocket body faces the rear portion of the pocket handle.

9. The dishwasher appliance of claim 8, wherein the second pocket body defines a first contact surface at the first lap joint portion, the first contact surface of the second pocket body faces the rear portion of the pocket handle, the second pocket body defines a second contact surface at the second lap joint portion, and the second contact surface of the second pocket body faces the front portion of the pocket handle.

10. The dishwasher appliance of claim 8, wherein the first contact surface of the first pocket body is positioned against the first contact surface of the second pocket body at the first lap joint portion, and the second contact surface of the first pocket body is positioned against the second contact surface of the second pocket body at the second lap joint portion.

11. The dishwasher appliance of claim 8, wherein a length of the lap joint along a lateral direction is about equal to a length of the second pocket body along the lateral direction, and the lateral direction is perpendicular to the transverse direction.

12. The dishwasher appliance of claim 8, wherein the door further comprises a top panel positioned at a top portion of the front panel above the opening of the front panel; and a top panel bracket disposed within the front panel, the top panel bracket mounted within the front panel such that the panel bracket is fixed relative to the front panel, the top panel positioned on and mounted to the top panel bracket, the top panel bracket defining a slot, wherein the pocket handle comprises a projection, the projection disposed within the slot of the top panel bracket.

13. The dishwasher appliance of claim 12, wherein:

the projection has a contact surface facing towards the front panel;

the top panel bracket has a contact surface at the slot, and the contact surface of the top panel bracket is disposed between the front panel and the projection and faces towards the contact surface of the projection; and wherein the contact surface of the projection impacts against the contact surface of the top panel bracket when an outward force is appliance to the pocket handle.

14. The dishwasher appliance of claim 12, wherein the top panel bracket defines at least one additional slot, the pocket handle further comprises at least one additional projection, and each of the at least one additional projection is disposed within a respective slot of the at least one additional slot.

15. The dishwasher appliance of claim 8, wherein the pocket handle defines a grip surface within an interior of the pocket handle, the grip surface positioned above an opening of the pocket handle.

16. The dishwasher appliance of claim 15, wherein the pocket handle defines a slit above the opening of the pocket handle, an edge of the front panel disposed within the slit of the pocket handle.

17. The dishwasher appliance of claim 8, wherein:

the first pocket body defines an opening positioned at the front panel;

the first and second pocket bodies collectively define an interior that extends inwardly from the opening of the pocket handle; and the first pocket body defines a grip surface within the interior above the opening of the first pocket body.

* * * * *